United States Patent
Pawar et al.

(10) Patent No.: US 10,528,529 B1
(45) Date of Patent: Jan. 7, 2020

(54) MULTI-CORE JOURNAL SYSTEM AND METHOD

(71) Applicant: EMC Corporation, Hopkinton, MA (US)

(72) Inventors: Sitaram Pawar, Shrewsbury, MA (US); Philippe Armangau, Acton, MA (US); Srinivasa Rao Vempati, Upton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 247 days.

(21) Appl. No.: 14/581,254

(22) Filed: Dec. 23, 2014

(51) Int. Cl.
*G06F 16/18* (2019.01)
*G06F 3/06* (2006.01)

(52) U.S. Cl.
CPC .......... *G06F 16/1815* (2019.01); *G06F 3/065* (2013.01); *G06F 3/0619* (2013.01); *G06F 3/0656* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 6,715,030 B1 * | 3/2004 | Vandenbergh | ........ | G06F 3/0626 360/48 |
| 2005/0010728 A1 * | 1/2005 | Piry | .................... | G06F 12/0831 711/147 |
| 2006/0047998 A1 * | 3/2006 | Darcy | .................... | G06F 3/061 714/6.12 |
| 2008/0126443 A1 * | 5/2008 | Cochran | ............. | G06F 11/2082 |
| 2011/0022807 A1 * | 1/2011 | Maeda | .................. | G06F 3/0619 711/154 |
| 2012/0131298 A1 * | 5/2012 | Arakawa | ............. | G06F 11/2064 711/162 |
| 2013/0185582 A1 * | 7/2013 | Tsukamoto | ........... | G06F 3/0625 713/340 |

* cited by examiner

*Primary Examiner* — Charles J Choi
(74) *Attorney, Agent, or Firm* — Brian J. Colandreo; Mark H. Whittenberger; Holland & Knight LLP (57) ABSTRACT

A method, computer program product, and computing system for receiving a first write request on a front-end computing system within a storage system. The first write request concerns writing a first data portion to a storage array within the storage system. A first log entry is generated within a journal file. The first log entry identifies a first differential storage quantity associated with storing the first data portion in the storage array within the storage system.

12 Claims, 4 Drawing Sheets

MULTI-CORE JOURNAL SYSTEM AND METHOD

TECHNICAL FIELD

This disclosure relates to journaling systems and, more particularly, to journaling systems for use in data storage systems.

BACKGROUND

Storing and safeguarding electronic content is of paramount importance in modern business. Accordingly, large storage systems may be utilized to protect such electronic content. In order to enhance the delivery of such electronic content to requesting devices, such large storage systems may utilize journaling systems. Unfortunately, the use of multi-core microprocessors may complicate the use of such journaling systems due to their ability to parallel process multiple write requests.

SUMMARY OF DISCLOSURE

In one implementation, a computer-implemented method includes receiving a first write request on a front-end computing system within a storage system. The first write request concerns writing a first data portion to a storage array within the storage system. A first log entry is generated within a journal file. The first log entry identifies a first differential storage quantity associated with storing the first data portion in the storage array within the storage system.

One or more of the following features may be included. The first log entry may include tracking metadata including one or more of: superblock differential metadata, slice differential metadata, and cylinder group differential metadata. A second write request may be received on the front-end computing system within the storage system. The second write request may concern writing a second data portion to the storage array within the storage system. A second log entry may be generated within the journal file. The second log entry may identify a second differential storage quantity associated with storing the second data portion in the storage array within the storage system. The second log entry may include tracking metadata including one or more of: superblock differential metadata, slice differential metadata, and cylinder group differential metadata.

The first write request and the second write request may be processed on a multi-core microprocessor included within the front-end computing system of the storage system. A first available storage quantity may be determined for the first write request based, at least in part, upon the first differential storage quantity. A second available storage quantity may be determined for the second write request based, at least in part, upon the second differential storage quantity. The first data portion and the second data portion may be stored within a buffer system for subsequent storage within the storage array of the storage system. The first data portion may be copied from the buffer system to the storage array of the storage system. The second data portion may be copied from the buffer system to the storage array of the storage system.

In another implementation, a computer program product resides on a computer readable medium and has a plurality of instructions stored on it. When executed by a processor, the instructions cause the processor to perform operations including receiving a first write request on a front-end computing system within a storage system. The first write request concerns writing a first data portion to a storage array within the storage system. A first log entry is generated within a journal file. The first log entry identifies a first differential storage quantity associated with storing the first data portion in the storage array within the storage system.

One or more of the following features may be included. The first log entry may include tracking metadata including one or more of: superblock differential metadata, slice differential metadata, and cylinder group differential metadata. A second write request may be received on the front-end computing system within the storage system. The second write request may concern writing a second data portion to the storage array within the storage system. A second log entry may be generated within the journal file. The second log entry may identify a second differential storage quantity associated with storing the second data portion in the storage array within the storage system. The second log entry may include tracking metadata including one or more of: superblock differential metadata, slice differential metadata, and cylinder group differential metadata.

The first write request and the second write request may be processed on a multi-core microprocessor included within the front-end computing system of the storage system. A first available storage quantity may be determined for the first write request based, at least in part, upon the first differential storage quantity. A second available storage quantity may be determined for the second write request based, at least in part, upon the second differential storage quantity. The first data portion and the second data portion may be stored within a buffer system for subsequent storage within the storage array of the storage system. The first data portion may be copied from the buffer system to the storage array of the storage system. The second data portion may be copied from the buffer system to the storage array of the storage system.

In another implementation, a computing system including a processor and memory is configured to perform operations including receiving a first write request on a front-end computing system within a storage system. The first write request concerns writing a first data portion to a storage array within the storage system. A first log entry is generated within a journal file. The first log entry identifies a first differential storage quantity associated with storing the first data portion in the storage array within the storage system.

One or more of the following features may be included. The first log entry may include tracking metadata including one or more of: superblock differential metadata, slice differential metadata, and cylinder group differential metadata. A second write request may be received on the front-end computing system within the storage system. The second write request may concern writing a second data portion to the storage array within the storage system. A second log entry may be generated within the journal file. The second log entry may identify a second differential storage quantity associated with storing the second data portion in the storage array within the storage system. The second log entry may include tracking metadata including one or more of: superblock differential metadata, slice differential metadata, and cylinder group differential metadata.

The first write request and the second write request may be processed on a multi-core microprocessor included within the front-end computing system of the storage system. A first available storage quantity may be determined for the first write request based, at least in part, upon the first differential storage quantity. A second available storage quantity may be determined for the second write request based, at least in part, upon the second differential storage quantity. The first data portion and the second data portion may be stored within a buffer system for subsequent storage within the storage array of the storage system. The first data portion may be copied from the buffer system to the storage array of the storage system. The second data portion may be copied from the buffer system to the storage array of the storage system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
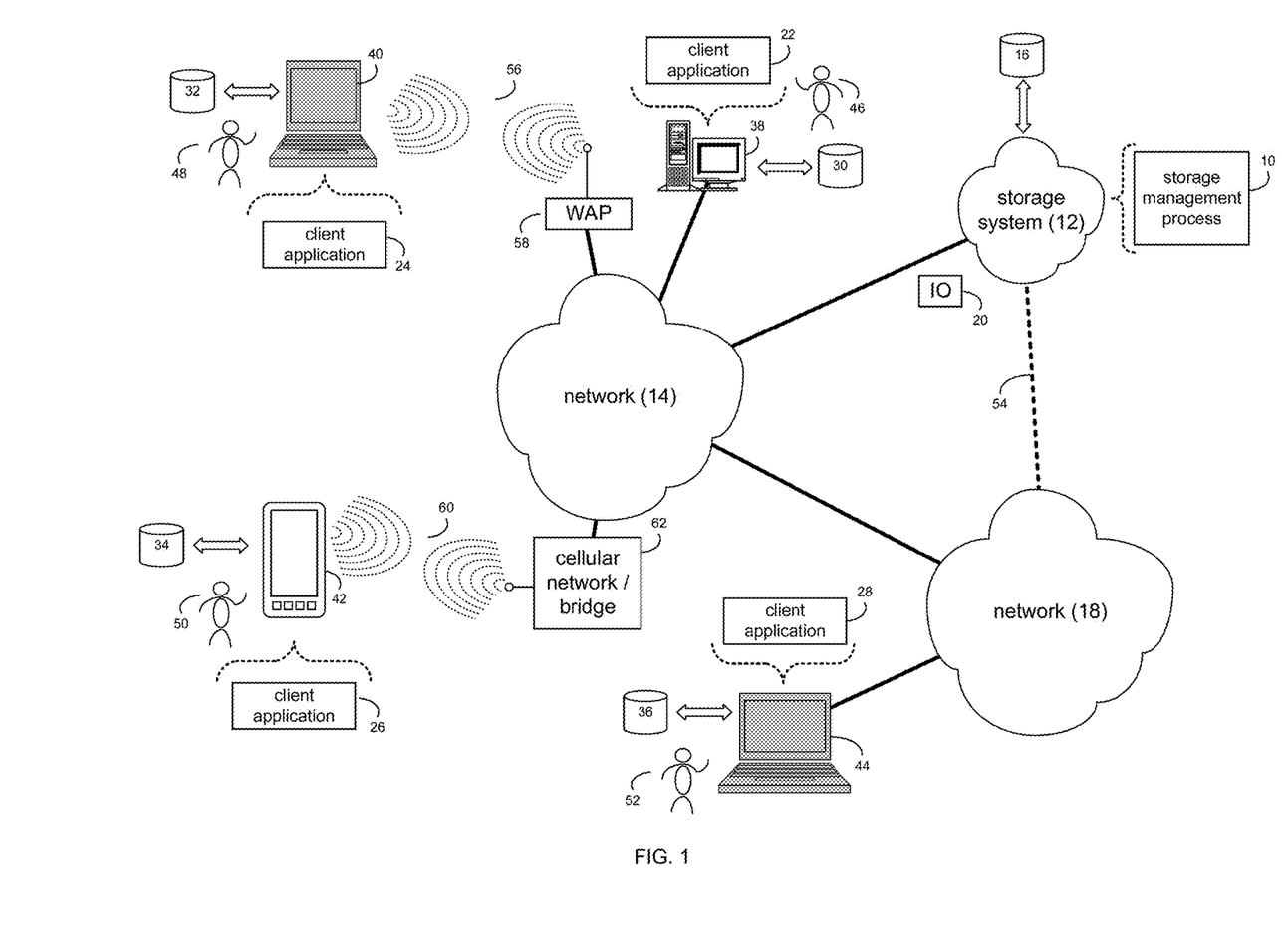
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Alternatively, the instruction sets and subroutines of client applications 22, 24, 26, 28 may be stored on storage system 12. Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smart cellular telephone 42, notebook computer 44, a server (not shown), a personal digital assistant (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smart cellular telephone 42 is shown wirelessly coupled to network 14 via wireless communication channel 60 established between smart cellular telephone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
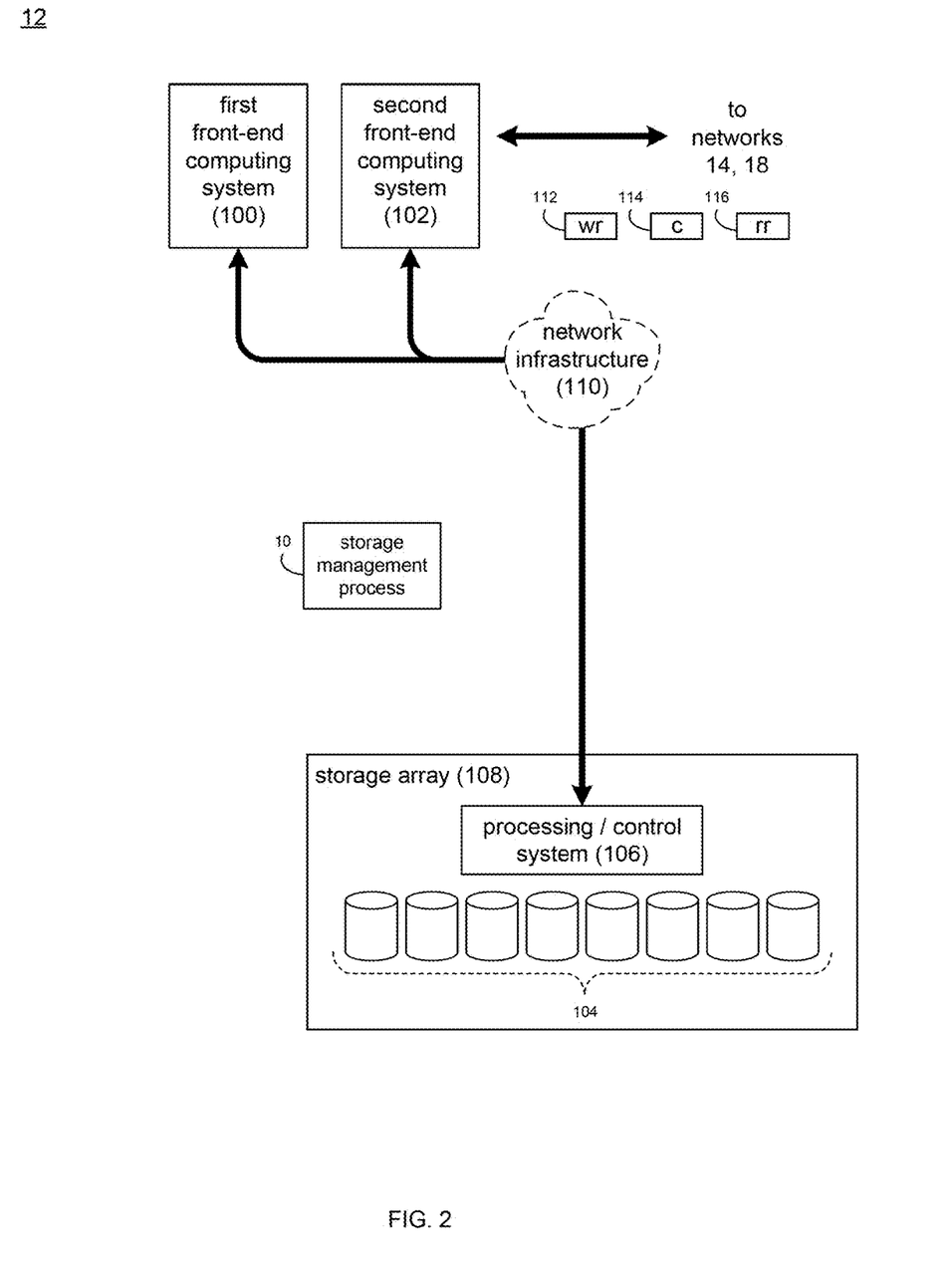
FIG. 2 is a diagrammatic view of the storage system of FIG. 1.

Referring also to FIG. 2, storage system 12 may include one or more computing systems (e.g., first front-end computing system 100 and second front-end computing system 102) and a plurality of storage targets 104. Examples of first front-end computing system 100 and second front-end computing system 102 may include, but are not limited to, one or more storage processors and/or one or more server computers. The quantity of storage targets included within plurality of storage targets 104 may be increased or decreased depending upon e.g. the level of redundancy/performance/capacity required.

Plurality of storage targets 104 may be configured to provide various levels of performance and/or high availability. For example, a portion of plurality of storage targets 104 may be configured as a RAID 0 array, in which data is striped across storage targets. By striping data across a plurality of storage targets, improved performance may be realized. However, RAID 0 arrays do not provide a level of high availability. Accordingly, a portion of plurality of storage targets 104 may be configured as a RAID 1 array, in which data is mirrored between storage targets. By mirroring data between storage targets, a level of high availability is achieved as multiple copies of the data are stored within storage system 12.

While plurality of storage targets 104 is discussed above as being configured in a RAID 0 or RAID 1 array, this is for illustrative purposes only and is not intended to be a limitation of this disclosure, as other configurations are possible. For example, plurality of storage targets 104 may be configured as a RAID 3, RAID 4, RAID 5 or RAID 6 array.

Plurality of storage targets 104 may include one or more coded targets. As is known in the art, a coded target may be used to store coded data that may allow for the regeneration of data lost/corrupted on one or more of plurality of storage targets 104. An example of such a coded target may include but is not limited to a hard disk drive that is used to store parity data within a RAID array. The quantity of coded targets included within plurality of storage targets 104 may be increased or decreased depending upon e.g. the level of redundancy/performance/capacity required.

Examples of plurality of storage targets 104 may include one or more electro-mechanical hard disk drives and/or solid-state/flash devices, wherein the combination of plurality of storage targets 104 and processing/control systems (e.g., processing/control system 106) may form storage array 108.

The manner in which storage system 12 is implemented may vary depending upon e.g. the level of redundancy/performance/capacity required. For example, storage system 12 may be a RAID device in which first front-end computing system 100 or second front-end computing system 102 is a RAID controller card and plurality of storage targets 104 are individual "hot-swappable" hard disk drives. An example of such a RAID device may include but is not limited to an NAS device. Alternatively, storage system 12 may be configured as a SAN, in which first front-end computing system 100 or second front-end computing system 102 may be e.g., a server computer and each of plurality of storage targets 104 may be a RAID device and/or computer-based hard disk drive. Further still, one or more of plurality of storage targets 104 may be a SAN.

In the event that storage system 12 is configured as a SAN, the various components of storage system 12 (e.g. first front-end computing system 100, second front-end computing system 102, plurality of storage targets 104, and processing/control system 106) may be coupled using network infrastructure 110, examples of which may include but are not limited to an Ethernet (e.g., Layer 2 or Layer 3) network, a fiber channel network, an InfiniBand network, or any other network infrastructure.

Storage system 12 may execute all or a portion of storage management process 10. The instruction sets and subroutines of storage management process 10, which may be stored on a storage device (e.g., storage device 16) coupled to first front-end computing system 100 and/or second front-end computing system 102 and/or processing/control system 106, may be executed by one or more processors (not shown) and one or more memory architectures (not shown) included within first front-end computing system 100 and/or second front-end computing system 102 and/or processing/control system 106. Storage device 16 may include but is not limited to: a hard disk drive; a tape drive; an optical drive; a RAID device; a random access memory (RAM); a read-only memory (ROM); and all forms of flash memory storage devices.

First front-end computing system 100 and/or second front-end computing system 102 may be configured as an application server and/or a proxy server. As is known in the art, an application server is a computing system that runs an application (e.g., a database application or an engineering/design application), wherein other objects (e.g., client electronic devices 38, 40, 42, 44) may access and utilize the application being served by the application server. Further and as is known in the art, a proxy server is a computing system that is accessible by other objects (e.g., client electronic devices 38, 40, 42, 44) that may be used as a common destination for processing requests, such as IO requests (e.g., IO request 20).

As discussed above, various IO requests (e.g. IO request 20) may be processed by storage system 12. For example, these IO requests may be sent from client applications 22, 24, 26, 28 to first front-end computing system 100 and/or second front-end computing system 102 (when first front-end computing system 100 and/or second front-end computing system 102 are configured as a proxy server). Additionally/alternatively, these IO requests (e.g. IO request 20) may be internally generated within first front-end computing system 100 and/or second front-end computing system 102 (when first front-end computing system 100 and/or second front-end computing system 102 are configured as an application server).

Examples of IO request 20 may include but are not limited to data write request 112 (i.e. a request that content 114 be written to storage system 12) and data read request 116 (i.e. a request that content 114 be read from storage system 12).

When first front-end computing system 100 and/or second front-end computing system 102 are configured as a proxy server, content 114 to be written to storage system 12 may be processed by first front-end computing system 100 and/or second front-end computing system 102. Additionally/alternatively and when first front-end computing system 100 and/or second front-end computing system 102 are configured as an application server, content 114 to be written to storage system 12 may be internally generated by first front-end computing system 100 and/or second front-end computing system 102.

Figure 3:
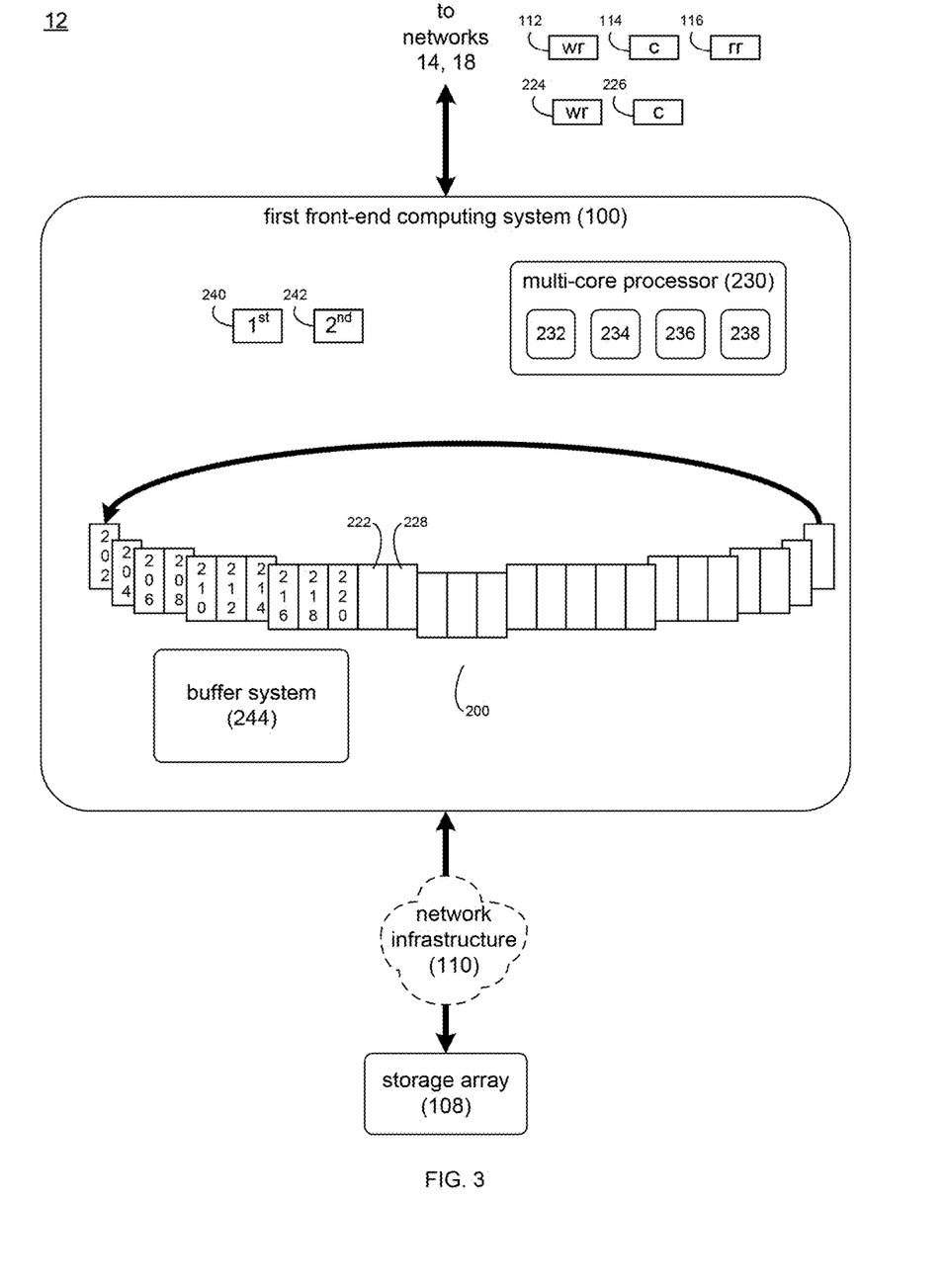
FIG. 3 is another diagrammatic view of the storage system of FIG. 1.

The Storage Management Process:

Referring also to FIG. 3, storage management process 10 may define a journal file (e.g., journal file 200) for use within data storage system 12. Journal file 200 may be configured to track intrusive operations requested of storage system 12. An intrusive operation may be any operation that results in the creation/modification of data on storage system 12. Accordingly, data write request 112 (i.e. a request that content 114 be written to storage system 12) may be considered an intrusive operation; while data read request 116 (i.e. a request that content 114 be read from storage system 12) may not be considered an intrusive operation.

Journal file 200 may be configured as (and may be considered) a "circular" file, in which data is sequentially written to journal file 200 and, once journal file 200 is full, the oldest data within journal file 200 may be overwritten with new data. While journal file 200 is shown to include twenty seven separate portions, this is for illustrative purposes and is not intended to be a limitation of this disclosure, as other configurations are possible and are considered to be within the scope of this disclosure.

During operation of storage system 12, storage management process 10 may process various IO requests for data storage system 12. As discussed above, if the IO requests are intrusive IO requests (e.g., write request 112), storage management process 10 may update journal file 200 to include information concerning the IO requests. For example, if the IO requests processed by storage system 12 include ten intrusive requests, storage management process 10 may update journal file 200 to include information (e.g., information 202, 204, 206, 208, 210, 212, 214, 216, 218, 220) concerning each of these intrusive data requests (e.g., write request 112).

Concerning the type of information included within journal file 200, this information may identify the differential storage quantity (i.e., change in available storage) associated with storing the content (e.g., content 114) in storage array 108 within storage system 12. The information included within journal file 200 may include tracking metadata, examples of which may include, but are not limited to, one or more of: superblock differential metadata that may define the change in free data blocks (i.e., a unit of storage) required to store a data portion (e.g., content 114) within storage array 108; slice differential metadata that may define the change in free data blocks in a target slice partition (i.e., a unit of storage) required to store the data portion (e.g., content 114) within storage array 108, and cylinder group differential metadata that may define the change in free blocks and block bitmaps in the target cylinder group partition (i.e., a unit of storage) required to store the data portion (e.g., content 114) within the storage array 108.

Additionally, the information included within journal file 200 may also include a log record number for the content (e.g., content 114), attributes of the content (e.g., content 114), the location (e.g., block addresses) of the content (e.g., content 114) within storage array 108, permissions associated with the content (e.g., content 114), a unique transaction identifier for the transaction/IO request, etc.

Figure 4:
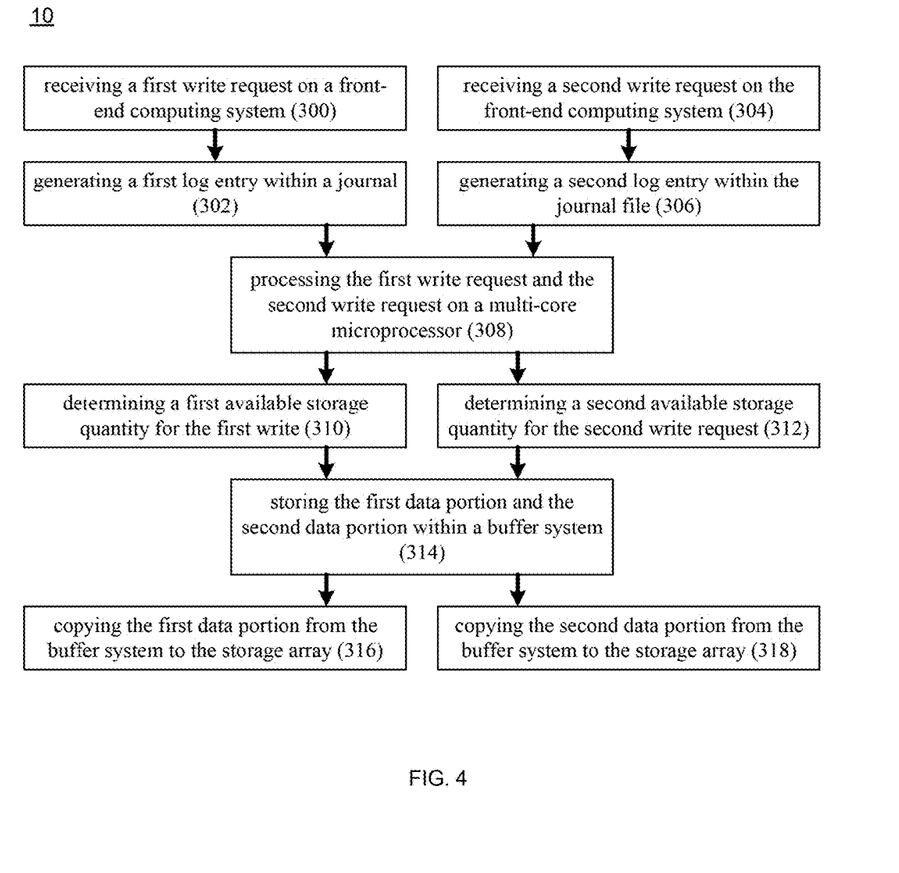
FIG. 4 is a flow chart of the storage management process of FIG. 1.

Referring also to FIG. 4 and continuing with the above-stated example, assume that storage management process 10 receives 300 a first write request (e.g., write request 112) on a front-end computing system (e.g., first front-end computing system 100) within storage system 12. As discussed above and for this example, assume that the first write request (e.g., write request 112) concerns writing a first data portion (e.g., content 114) to storage array 108 within storage system 12. Since write request 112 is an intrusive request, storage management process 10 may generate 302 a first log entry (e.g., log entry 222) within journal file 200.

As discussed above, log entry 222 may include tracking metadata that may define the differential storage quantity (i.e., change in available storage) associated with storing the content (e.g., content 114) in storage array 108 within storage system 12. Examples of this tracking metadata may include but are not limited to superblock differential metadata, slice differential metadata, and cylinder group differential metadata. Additionally and as discussed above, log entry 222 may also include a log record number for content 114, attributes of content 114, the location of content 114 within storage array 108, permissions associated with content 114, and a unique transaction identifier for write request 112.

As previously discussed, superblock differential metadata may define the change in free data blocks required to store the first data portion (e.g., content 114) within storage array 108. Accordingly, assume for illustrative purposes that, prior to the processing of write request 112, storage array 108 has 20,000 data blocks available for storage. Further, assume that content 114 (i.e., the content associated with write request 112) will utilize three data blocks when it is written to storage array 108. Accordingly, when storage management process 10 generates 302 the first log entry (e.g., log entry 222), log entry 222 may include superblock differential metadata "3" to indicate that when write request 112 is subsequently processed and content 114 is written to storage array 108, three data blocks will be utilized.

As previously discussed, slice differential metadata may define the change in free data blocks in a target slice partition required to store the first data portion (e.g., content 114) within storage array 108. Accordingly, assume for illustrative purposes that, prior to the processing of write request 112, storage array 108 has a slice partition with 100,000 free data blocks available for storage. Further, assume that content 114 (i.e., the content associated with write request 112) will utilize sixteen data blocks when it is written to storage array 108. Accordingly, when storage management process 10 generates 302 the first log entry (e.g., log entry 222), log entry 222 may include slice differential metadata "16" to indicate that when write request 112 is subsequently processed and content 114 is written to storage array 108, sixteen data blocks will be utilized.

As previously discussed, cylinder group differential metadata may define the change in free blocks in the target cylinder group partition groups required to store the first data portion (e.g., content 114) within the storage array 108. Accordingly, assume for illustrative purposes that, prior to the processing of write request 112, storage array 108 has 350,000 free data blocks in a cylinder group partition available for storage. Further, assume that content 114 (i.e., the content associated with write request 112) will utilize one-hundred-twenty-eight data blocks from the cylinder group partition when it is written to storage array 108. Accordingly, when storage management process 10 generates 302 the first log entry (e.g., log entry 222), log entry 222 may include cylinder group differential metadata "128" to indicate that when write request 112 is subsequently processed and content 114 is written to storage array 108, one-hundred-twenty-eight data blocks from the cylinder group partition will be utilized.

Continuing with the above-stated example, assume that storage management process 10 receives 304 a second write request (e.g., write request 224) on the front-end computing system (e.g., first front-end computing system 100) within storage system 12. The second write request (e.g., write request 224) may concern writing a second data portion (e.g., content 226) to storage array 108 within storage system 12. Since write request 224 is an intrusive request, storage management process 10 may generate 306 a second log entry (e.g., log entry 228) within journal file 200.

As discussed above, log entry 228 may include tracking metadata that may define the differential storage quantity (i.e., change in available storage) associated with storing the content (e.g., content 226) in storage array 108 within storage system 12. Again, examples of this tracking metadata may include but are not limited to superblock differential metadata, slice differential metadata, and cylinder group differential metadata. Again, log entry 228 may also include a log record number for content 226, attributes of content 226, the location of content 226 within storage array 108, permissions associated with content 226, and a unique transaction identifier for write request 224.

As previously discussed, superblock differential metadata may define the change in free data blocks required to store the second data portion (e.g., content 226) within storage array 108. Accordingly, assume for illustrative purposes that, prior to the processing of write request 112 or write request 224, storage array 108 has 20,000 data blocks available for storage. Further, assume that content 226 (i.e., the content associated with write request 224) will utilize six data blocks when it is written to storage array 108. Accordingly, when storage management process 10 generates 306 the second log entry (e.g., log entry 228), log entry 228 may include superblock differential metadata "6" to indicate that when write request 224 is subsequently processed and content 226 is written to storage array 108, six data blocks will be utilized.

As previously discussed, slice differential metadata may define the number of change in free data blocks in a target slice partition required to store the second data portion (e.g., content 226) within storage array 108. Accordingly, assume for illustrative purposes that, prior to the processing of write request 112 or write request 224, storage array 108 has a slice partition with 100,000 free data blocks available for storage. Further, assume that content 226 (i.e., the content associated with write request 224) will utilize thirty-two data blocks when it is written to storage array 108. Accordingly, when storage management process 10 generates 306 the second log entry (e.g., log entry 228), log entry 228 may include slice differential metadata "32" to indicate that when write request 224 is subsequently processed and content 226 is written to storage array 108, thirty-two data blocks will be utilized.

As previously discussed, cylinder group differential metadata may define the change in free blocks in the target cylinder group partition required to store the second data portion (e.g., content 226) within the storage array 108. Accordingly, assume for illustrative purposes that, prior to the processing of write request 112 or write request 224, storage array 108 has 350,000 free data blocks in a cylinder partition available for storage. Further, assume that content 226 (i.e., the content associated with write request 224) will utilize two-hundred-fifty-six data blocks from the cylinder group partition when it is written to storage array 108. Accordingly, when storage management process 10 generates 306 the second log entry (e.g., log entry 228), log entry 228 may include cylinder group differential metadata "256" to indicate that when write request 224 is subsequently processed and content 226 is written to storage array 108, two-hundred-fifty-six data blocks will be utilized.

Storage management process 10 may process 308 first write request 112 and second write request 224 on multi-core microprocessor 230 included within the front-end computing system (e.g., first front-end computing system 100) of storage system 12. Multi-core microprocessor 230 may include a plurality of cores (e.g., cores 232, 234, 236, 238) that may be configured to simultaneously process IO requests. For example, assume that first write request 112 and second write request 224 essentially simultaneously arrive at first front-end computing system 100 (with first write request 112 arriving just before second write request 224) and log entries 222, 228 are essentially simultaneously written to log file 200 (with log entry 222 being written just before log entry 228).

Continuing with the above-stated example, assume that core 232 of multi-core processor 230 processes 308 first write request 112 and core 234 of multi-core processor 230 processes 308 second write request 224. Once the processing 308 of a write request is completed (by a particular core of multi-core processor 230), storage management process 10 may determine an available storage quantity for that particular write request based, at least in part, upon the differential storage quantity of the particular write request.

For example, assume that core 232 completes the processing 308 of first write request 112 prior to core 234 completing the processing 308 of second write request 224. In such a situation, storage management process 10 may determine 310 first available storage quantity 240 for first write request 112 based, at least in part, upon the first differential storage quantity (as defined within log entry 222). Therefore and in this particular example, the first differential storage quantity (as defined within log entry 222) includes "3" data blocks, "16" data blocks from a slice partition, and "128" data blocks from a cylinder group partition. Accordingly, first available storage quantity 240 may define 19,997 data blocks (i.e., 20,000 cylinder blocks−3 cylinder blocks), 99,984 data blocks from a slice partition (i.e., 100,000 data blocks−16 data blocks), and 349,872 data blocks from a cylinder group partition (i.e., 350,000 data blocks−128 data blocks).

Storage management process 10 may further determine 312 second available storage quantity 242 for second write request 224 based, at least in part, upon the second differential storage quantity (as defined within log entry 228). Therefore and in this particular example, the second differential storage quantity (as defined within log entry 222) includes "6" data blocks, "32" data blocks from a slice partition, and "256" data blocks from a cylinder group partition. Accordingly, the second available storage quantity may define 19,991 data blocks (i.e., 19,997 data blocks−6 data cylinder blocks), 99,952 data blocks from a slice partition (i.e., 99,984 data blocks−32 data blocks), and 349,616 data blocks from a cylinder group partition (i.e., 349,872 data blocks−256 data blocks).

Through the use of a system in which the log entries (e.g., log entries 222, 228) included within log file 200 define the differential storage quantity (i.e., change in available storage) associated with storing the content (as opposed to the available storage quantity . . . which is not defined until after the write requests are processed), the order in which multi-core microprocessor 230 processes the individual write requests does not matter, as the available storage quantity is always accurate.

For example, assume the opposite scenario of the situation described above. Namely, assume that core 232 completes the processing 308 of first write request 112 after core 234 completes processing 308 of second write request 224. In such a opposite situation, storage management process 10 may determine 312 second available storage quantity 242 for second write request 224 before determining 310 first available storage quantity 240 for first write request 112.

For example, storage management process 10 may determine 312 second available storage quantity 242 for second write request 224 based, at least in part, upon the second differential storage quantity (as defined within log entry 228). Therefore and in this particular example, the second differential storage quantity (as defined within log entry 222) includes "6" data blocks, "32" data blocks from a slice partition, and "256" data blocks from a cylinder group partition. Accordingly, second available storage quantity 242 may define 19,994 data blocks (i.e., 20,000 cylinder blocks−6 cylinder blocks), 99,968 data blocks from a slice partition (i.e., 100,000 data blocks−32 data blocks), and 349,744 data blocks from a cylinder group partition (i.e., 350,000 data blocks−256 data blocks).

Storage management process 10 may then determine 310 first available storage quantity 240 for first write request 112 based, at least in part, upon the first differential storage quantity (as defined within log entry 222). Therefore and in this particular example, the first differential storage quantity (as defined within log entry 222) includes "3" data blocks, "16" data blocks from a slice partition, and "128" data blocks from a cylinder group partition. Accordingly, first available storage quantity 240 may define 19,991 data blocks (i.e., 19,994 cylinder blocks–3 cylinder blocks), 99,952 data blocks from a slice partition (i.e., 100,000 data blocks–16 data blocks), and 349,616 data blocks from a cylinder group partition (i.e., 350,000 data blocks–128 data blocks).

Accordingly, available storage quantities 240, 242 as determined by storage management process 10 are identical regardless of the order in which write requests 112, 224 are processed 308 by multi-core processor 230, since available storage quantities 240, 242 are not determined 310, 312 by storage management process 10 until after the processing 308 of the related write request is competed by multi-core processor 230.

Once processed 310, 312, storage management process 10 may store 314 the first data portion (e.g., content 114) and the second data portion (e.g., content 226) within a buffer system (e.g., buffer system 244) for subsequent storage within storage array 108 of storage system 12. Accordingly and subsequently, storage management process 10 may copy 316 the first data portion (e.g., content 114) from buffer system 244 to storage array 108 of storage system 12 and may copy 318 the second data portion (e.g., content 226) from buffer system 244 to storage array 108 of storage system 12.

Once the content (e.g., content 114) associated with write request 112 is written to storage array 108, storage management process 10 may notify the host associated with write request 112 that write request 112 has been processed. Further, once the content (e.g., content 226) associated with write request 224 is written to storage array 108, storage management process 10 may notify the host associated with write request 224 that write request 224 has been processed.

As discussed above, the information included within journal file 200 may also include a log record number for the content (e.g., content 114), attributes of the content (e.g., content 114), the location (e.g., block addresses) of the content (e.g., content 114) within storage array 108, permissions associated with the content (e.g., content 114), a unique transaction identifier for the transaction/IO request, etc.

Additionally, journal file 200 may be configured to include a "committed record number". Specifically, this "committed record number" may define the last transaction in which the data (e.g., content 114) was written to storage array 108 of storage system 12. Accordingly, in the event of e.g., a failure of first front-end computing system 100 and journal file 200 being processed to recover any data that was not yet written to storage array 108 of storage system 12, only entries within journal file 200 that include a log record number that is greater than the "committed record number" would be processed (as those with a log record number that is equal to or less than the "committed record number" would have already been processed and stored on storage array 108 of storage system 12.

While the system is described above as including computing systems (e.g., first front-end computing system 100 and second front-end computing system 102), this is for illustrative purposes only and is not intended to be a limitation of this disclosure, as other configurations are possible. For example, the number of computing systems may be increased or decreased.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   receiving, on a computing device, a first write request on a front-end computing system within a storage system, wherein the first write request concerns writing a first data portion to a storage array within the storage system;
   generating, on the computing device, a first log entry within a journal file, wherein the first log entry identifies a first differential storage quantity associated with storing the first data portion in the storage array within the storage system and includes one or more of a log record number for the first data portion, attributes of the first data portion, a location within the storage array of the first data portion, permissions associated with the first data portion, and a unique transaction identifier for the first write request, wherein the first log entry includes tracking slice differential metadata defining a change in free data blocks in a target slice partition required to store the first data portion and tracking cylinder group differential metadata defining a change in free data blocks and block bitmaps in a target cylinder group partition required to store the first data portion;
   receiving a second write request on the front-end computing system within the storage system, wherein the second write request concerns writing a second data portion to the storage array within the storage system;
   generating a second log entry within the journal file, wherein the second log entry identifies a second differential storage quantity associated with storing the second data portion in the storage array within the storage system;
   processing the first write request on a first core of a multi-core microprocessor included within the front-end computing system of the storage system and the second write request on a second core of the multi-core microprocessor, wherein the first write request is processed before the second write request, wherein processing the second core of the multi-core microprocessor occurs independently from processing the first write request by the first core of the multi-core microprocessor, and wherein the journal file includes a committed record number where, in an event of a failure of the first front-end computing system and the journal file being processed to recover data that was not yet written to the storage array, only entries of the first log entry and the second log entry within the journal file having a greater log record number than the committed record number are processed;
   determining a first available storage quantity for the first write request based, at least in part, upon the first differential storage quantity identified in the first log entry; and
   determining a second available storage quantity for the second write request based, at least in part, upon the first differential storage quantity identified in the first log entry and the second differential storage quantity identified in the second log entry.

2. The computer-implemented method of claim 1 wherein the first log entry includes tracking superblock differential metadata defining a change in free data blocks in a target file system required to store the first data portion.

3. The computer-implemented method of claim 1 wherein the second log entry includes tracking metadata including one or more of:
   superblock differential metadata,
   slice differential metadata, and
   cylinder group differential metadata.

4. The computer-implemented method of claim 1 further comprising:
   storing the first data portion and the second data portion within a buffer system for subsequent storage within the storage array of the storage system;
   copying the first data portion from the buffer system to the storage array of the storage system; and
   copying the second data portion from the buffer system to the storage array of the storage system.

5. A computer program product residing on a non-transitory computer readable medium having a plurality of instructions stored thereon which, when executed by a processor, cause the processor to perform operations comprising:
   receiving a first write request on a front-end computing system within a storage system, wherein the first write request concerns writing a first data portion to a storage array within the storage system;
   generating a first log entry within a journal file, wherein the first log entry identifies a first differential storage quantity associated with storing the first data portion in the storage array within the storage system and includes one or more of a log record number for the first data portion, attributes of the first data portion, a location within the storage array of the first data portion, permissions associated with the first data portion, and a unique transaction identifier for the first write request, wherein the first log entry includes tracking slice differential metadata defining a change in free data blocks in a target slice partition required to store the first data portion and tracking cylinder group differential metadata defining a change in free data blocks and block bitmaps in a target cylinder group partition required to store the first data portion;
   receiving a second write request on the front-end computing system within the storage system, wherein the second write request concerns writing a second data portion to the storage array within the storage system;
   generating a second log entry within the journal file, wherein the second log entry identifies a second differential storage quantity associated with storing the second data portion in the storage array within the storage system;
   processing the first write request on a first core of a multi-core microprocessor included within the front-end computing system of the storage system and the second write request on a second core of the multi-core microprocessor, wherein the first write request is processed before the second write request, wherein processing the second core of the multi-core microprocessor occurs independently from processing the first write request by the first core of the multi-core microprocessor, and wherein the journal file includes a committed record number where, in an event of a failure of the first front-end computing system and the journal file being processed to recover data that was not yet written to the storage array, only entries of the first log entry and the second log entry within the journal file having a greater log record number than the committed record number are processed;
   determining a first available storage quantity for the first write request based, at least in part, upon the first differential storage quantity identified in the first log entry; and
   determining a second available storage quantity for the second write request based, at least in part, upon the first differential storage quantity identified in the first log entry and the second differential storage quantity identified in the second log entry.

6. The computer program product of claim 5 wherein the first log entry includes tracking superblock differential metadata defining a change in free data blocks in a target file system required to store the first data portion.

7. The computer program product of claim 5 wherein the second log entry includes tracking metadata including one or more of:
   superblock differential metadata,
   slice differential metadata, and
   cylinder group differential metadata.

8. The computer program product of claim 5 further comprising instructions configured to perform operations including:
   storing the first data portion and the second data portion within a buffer system for subsequent storage within the storage array of the storage system;
   copying the first data portion from the buffer system to the storage array of the storage system; and
   copying the second data portion from the buffer system to the storage array of the storage system.

9. A computing system including a processor and memory configured to perform operations comprising:
   receiving a first write request on a front-end computing system within a storage system, wherein the first write request concerns writing a first data portion to a storage array within the storage system;
   generating a first log entry within a journal file, wherein the first log entry identifies a first differential storage quantity associated with storing the first data portion in the storage array within the storage system and includes one or more of a log record number for the first data portion, attributes of the first data portion, a location within the storage array of the first data portion, permissions associated with the first data portion, and a unique transaction identifier for the first write request, wherein the first log entry includes tracking slice differential metadata defining a change in free data blocks in a target slice partition required to store the first data portion and tracking cylinder group differential metadata defining a change in free data blocks and block bitmaps in a target cylinder group partition required to store the first data portion;
   receiving a second write request on the front-end computing system within the storage system, wherein the second write request concerns writing a second data portion to the storage array within the storage system;
   generating a second log entry within the journal file, wherein the second log entry identifies a second differential storage quantity associated with storing the second data portion in the storage array within the storage system;
   processing the first write request on a first core of a multi-core microprocessor included within the front-end computing system of the storage system and the second write request on a second core of the multi-core microprocessor, wherein the first write request is processed before the second write request, wherein processing the second core of the multi-core microprocessor occurs independently from processing the first write request by the first core of the multi-core microprocessor, and wherein the journal file includes a committed record number where, in an event of a failure of the first front-end computing system and the journal file being processed to recover data that was not yet written to the storage array, only entries of the first log entry and the second log entry within the journal file having a greater log record number than the committed record number are processed;

determining a first available storage quantity for the first write request based, at least in part, upon the first differential storage quantity identified in the first log entry; and determining a second available storage quantity for the second write request based, at least in part, upon the first differential storage quantity identified in the first log entry and the second differential storage quantity identified in the second log entry.

10. The computing system of claim 9 wherein the first log entry includes tracking superblock differential metadata defining a change in free data blocks in a target file system required to store the first data portion.

11. The computing system of claim 9 wherein the second log entry includes tracking metadata including one or more of:

superblock differential metadata, slice differential metadata, and cylinder group differential metadata.

12. The computing system of claim 9 further configured to perform operations comprising:

storing the first data portion and the second data portion within a buffer system for subsequent storage within the storage array of the storage system;

copying the first data portion from the buffer system to the storage array of the storage system; and copying the second data portion from the buffer system to the storage array of the storage system.

* * * * *